United States Patent Office 2,746,270
Patented May 22, 1956

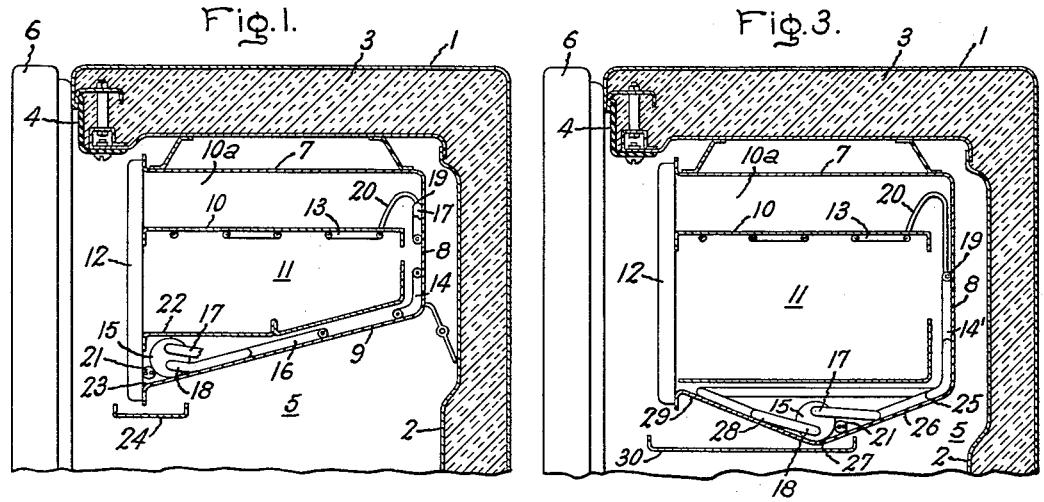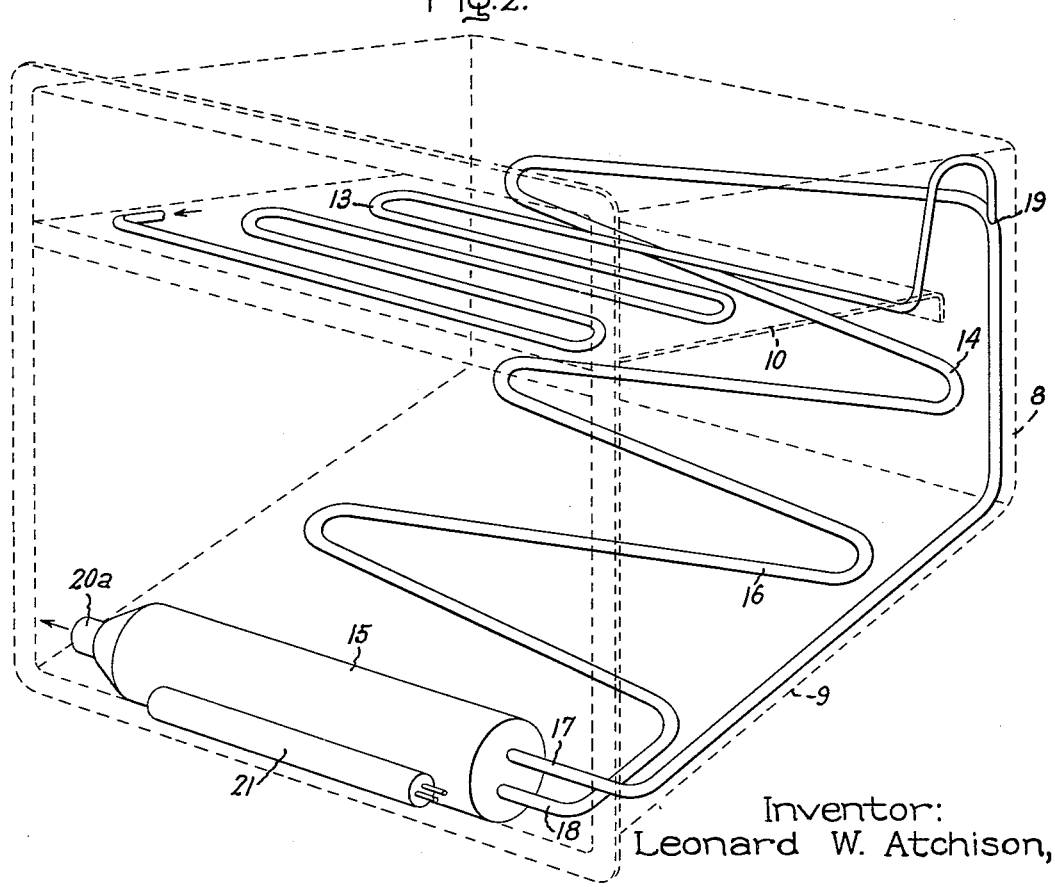

2,746,270

DEFROSTING ARRANGEMENTS FOR REFRIGERATING SYSTEMS

Leonard W. Atchison, Erie, Pa., assignor to General Electric Company, a corporation of New York Application July 8, 1952, Serial No. 297,635

10 Claims. (Cl. 62—126)

My invention relates to evaporator structures including refrigerating systems and more particularly to defrosting arrangements therefor.

In many household refrigerators, the evaporator including the food storage compartment is exposed to air within the compartment and is operated at a temperature below the freezing point of water. As a result moisture in the air within the storage compartment condenses on the evaporator and collects thereon in the form of frost. This layer of frost on the surface of the evaporator has an insulating effect reducing the efficiency of the evaporator in cooling the food storage compartment. It is accordingly necessary to remove this frost from time to time in order to prevent too serious a reduction in the operating efficiency of the refrigerating apparatus. In many cases, this defrosting is accomplished manually by stopping operation of the condensing unit and placing trays of warm water on the refrigerated surfaces of the evaporator. Defrosting in this manner is a somewhat time-consuming and disagreeable operation. By my invention relatively uniform heating and defrosting of the evaporator is accomplished without the necessity of using trays of warm water and the like, and the time required for the completion of the operation is materially reduced. Accordingly it is an object of my invention to provide an improved arrangement for defrosting a refrigerator evaporator.

It is another object of my invention to provide an improved arrangement for defrosting a refrigerator evaporator by which a relatively uniform defrosting of the evaporator surface is secured.

It is a further object of my invention to provide a defrosting arrangement in which heat is automatically supplied primarily to those surfaces upon which the greater amount of frost has collected.

It is still another object of my invention to provide an evaporator structure which facilitates disposition of defrost water and minimizes drippage of this water onto the food stored in the food storage compartment.

Further objects and advantages of my invention will become apparent as the following description proceeds, and the features of novelty which characterize my invention will be pointed out with particularity in the claims annexed to and forming part of this specification.

In carrying out the objects of my invention an evaporator structure is provided which includes an inclined bottom wall. The refrigerating system includes a header and a continuous conduit connected at both ends to to the header. The header is disposed at the lowest point of the evaporator and the continuous conduit extends upwardly therefrom, so that liquid refrigerant drains from the conduit into the header, providing a dry evaporator. For defrosting heat is supplied in the region of the header to vaporize the liquid refrigerant, and the vaporized refrigerant passes upwardly into the continuous conduit and condenses therein, thereby giving up heat to effect removal of frost from the evaporator.

For a better understanding of my invention, reference may be had to the accompanying drawing in which Fig. 1 is a side elevation view of a portion of a refrigerator incorporating an embodiment of my invention;

Fig. 2 is a perspective view showing the refrigerating system and defrosting arrangement; and Fig. 3 is a side elevation view of a portion of a refrigerator incorporating a modified form of my invention.

Referring to Fig. 1, there is shown a refrigerator cabinet including an outer wall 1 and a spaced inner wall or liner 2. The space between the inner and outer walls is filled with a suitable heat insulating material 3. The gap between the inner and outer walls adjacent the access opening of the refrigerator is closed by a breaker strip 4 formed of a material of low heat conductivity. The liner 2 defines a food storage compartment, part of which is shown at 5. The access opening of the food storage compartment 5 is closed by a door 6.

The evaporator structure includes a sheet of metal formed to provide a top wall 7, a back wall 8 and an inclined bottom wall 9. A shelf 10, preferably supported from the side walls 10a of the evaporator structure, is included within the freezing chamber 11 defined by the walls 7, 8, 9 and 10a. An evaporator door 12 is provided for closing the chamber 11.

The chamber 11 and the food storage compartment 5 are cooled by a refrigerating system which includes a first serpentine conduit 13 to which liquid refrigerant is supplied, in the direction indicated by the arrow in Fig. 2, from a condensing unit (not shown). The refrigerating system further includes a dry evaporator section 14. The dry evaporator section 14 includes a header 15 and a continuous conduit 16 connected at both ends 17 and 18 to the header 15.

The first conduit 13 is connected to the continuous conduit 16 at 19 to supply liquid refrigerant to the dry evaporator. The conduit 13 is formed to provide a trap 20 immediately preceding the connection at 19 for minimizing entry of vaporized refrigerant into the conduit 13 during the defrosting operation.

The connection at 19 is located substantially at the highest point of the dry evaporator 14 so that liquid refrigerant is introduced into the dry evaporator 14 substantially at the top thereof. The header 15, on the other hand, is disposed at the forward and lower end of the bottom wall 9 of the evaporator structure. The header 15, therefore, is disposed at the lowest point of the dry evaporator so that liquid refrigerant in the dry evaporator 14 tends to drain downwardly into the header 15, resulting in a dry, as opposed to a flooded, evaporator. The continuous conduit 16 is secured to the bottom wall 9 and the back wall 8 of the evaporator structure so as to be in heat exchange relationship with the sheet metal forming these walls. The first serpentine conduit 13 is secured to the shelf 10 in heat exchange relationship therewith to assist in cooling the chamber 11 and in refrigerating food articles placed directly on the shelf.

During operation of the refrigerating system liquid refrigerant is supplied to the conduit 13 and to the dry evaporator 14, and the vaporization of this liquid refrigerant is utilized to extract heat from the chamber 11 and from the food storage compartment 5. Vaporized refrigerant is withdrawn from the evaporator through a conduit 20a and returned to the condensing unit (not shown). After some period of operation, a substantial layer of frost may collect on the refrigerated surfaces of the evaporator structure, and this layer of frost, because of its insulating properties, materially reduces the capacity of the evaporator to cool the food storage compartment 5. Moreover, it has been found that this layer of frost does not form uniformly over the entire surface of the evaporator but, depending on various conditions, a thicker layer is formed in some regions and a thinner layer in others. In accordance with my invention, a defrosting arrangement is provided for removing this blanket of frost quickly and efficiently, and moreover the operation is such that heat for defrosting is supplied primarily to the surfaces upon which the greater amount of frost has collected.

A heating element or heater 21 is mounted in any suitable manner, for example, by brazing or welding, adjacent and in heat exchange relationship with the header 15, which insures a supply of liquid refrigerant adjacent the heating element. If desired for additional heating capacity, the heating element could extend not only in engagement with the header 15, but also in contact with a portion of the conduit 16 adjacent the end 18 thereof. Of course, in a system where sufficient liquid refrigerant is present to insure a supply adjacent the heating element, the heating element might be arranged entirely on the portion of the conduit 16 adjacent the end 18. However, in my preferred arrangement the heating element is arranged in contact with the header 15. The heating element 21 may be of any suitable type, for example any of the electrical heating elements now used for defrosting. When the heater 21 is energized the heat effects vaporization of liquid refrigerant in the header and in the section of tubing adjacent thereto. This vaporized refrigerant passes upwardly through the inclined conduit along the inclined bottom wall 9, the inclination of the conduit facilitating movement of vaporized refrigerant upwardly from the header and the lower end of the conduit, and the vaporized refrigerant condenses within the continuous conduit 16. In condensing, the vaporized refrigerant gives up heat and this heat is utilized for effecting melting and removal of frost from the evaporator structure. Moreover, the utilization of a dry evaporator with the header specifically disposed at the lowest point of the evaporator is effective for securing a quicker, more efficient, and more uniform melting of frost than is the case where a flooded evaporator is employed and where warm liquid refrigerant is utilized for defrosting. The heat given up during condensation, that is the latent heat of vaporization, is much greater than that available merely by cooling of a liquid which remains in the liquid state. Another advantage of the applicant's structure which provides defrosting through the use of vaporized refrigerant is that vapor tends to collect and condense on the coldest surface. Since this coldest surface will normally be that upon which the greatest amount of frost has collected during the refrigerating period, the vaporized refrigerant therefore condenses and gives up its heat to the very area of the dry evaporator where the greatest amount of defrosting is required. A merely uniform heating of the entire continuous conduit 16 would result in the frost being completely removed from some portions of the conduit while substantial amount might still remain on other portions. This, of course, is not as satisfactory or efficient as the applicant's arrangement in which heat is preferentially supplied to those surfaces where the greater amount of frost has collected and where the heat is therefore most required, and hence a relatively uniform removal of frost over the entire surface of the evaporator is secured.

Because of the interposition of the trap 20, passage of vaporized refrigerant to the conduit 13 on the shelf 10 during the defrosting operation is blocked. Hence the shelf 10 and the conduit 13 are not defrosted and no heat reaches the frozen foods, etc. stored on the shelf 10. It will be noted that the shelf 10 being enclosed within surrounding outer walls of the evaporator is not exposed to the air within the food storage compartment 5, and hence there is little tendency for frost to collect thereon. Moreover, the conduit 13 is not utilized for cooling the food storage compartment 5 and hence the presence of a layer of frost thereon does not have the same disadvantages as in the case of frost collecting on the walls 8 and 9 of the evaporator structure. Accordingly, this frost need be removed at much longer intervals than is required in connection with the walls 8 and 9, for example, and hence it is not necessary that the shelf be defrosted during each defrosting operation.

In order to minimize the transfer of heat to frozen food items stored within the chamber 11 below the shelf 10, a supporting surface or baffle 22 is disposed within the evaporator structure in spaced relationship with the conduit 16 of the dry evaporator 14. This baffle 22 may be supported from the side walls 10a of the evaporator structure.

The downwardly and forwardly inclined bottom wall 9 of the evaporator structure also facilitates disposition of defrost water and minimizes the dripping of this water onto the food stored in the food storage compartment 5. To facilitate drainage of substantially all of the defrost water to the forward lower end 23 of the bottom wall 9, this wall, depending on the material employed and the surface condition thereof, may be inclined an angle from approximately 12 to 18 degrees to the horizontal. For example, anodized aluminum provides a satisfactory surface for facilitating flow along the bottom wall. A trough 24 is provided at the forward end of the evaporator structure for collecting the defrost water draining down the back wall 8 and along the inclined bottom wall 9. This trough extends across the front of the food storage compartment and is inclined toward one or both sides for directing the defrost water toward the side walls of the liner 2. The trough also extends below the evaporator door 12 so that moisture condensing thereon drips into the trough for disposition rather than onto the food stored in the food storage compartment 5.

A modified form of my invention is shown in Fig. 3. The same numerals have been employed to designate corresponding parts in Figs. 1 and 2 and in Fig. 3. The modified form shown in Fig. 3 differs from that described above in that the bottom wall 25, instead of being inclined downwardly and forwardly to a low point at the forward end of the evaporator structure is inclined downwardly from its front and rear ends toward a low point at the center thereof. Thus the bottom wall 25 includes a section 26 inclined downwardly and forwardly from the back wall 9 to the central low point 27 and a second section 28 inclined downwardly and rearwardly from the forward end 29 to the central low point 27.

In the form shown in Fig. 3, the header 15 instead of being disposed at the low forward end of the evaporator structure is located at the low central point thereof. However, the header 15 is still located at the lowest point of the evaporator structure and at the lowest point of the dry evaporator 14'. The dry evaporator 14' is connected, as in the form previously described, through a trap 20 with the shelf-refrigerating conduit 13. The continuous conduit forming the dry evaporator 14' includes a portion secured to the back wall 8 and portions secured to both the inclined bottom wall sections 26 and 28. As in the form previously described, the continuous conduit is connected at its ends 17 and 18 with the header 15.

The operation of the defrosting arrangement in the modified form shown in Fig. 3 is the same as that of the form disclosed in Figs. 1 and 2 and previously described above. The heater 21 is connected in heat exchange relationship with the header 15 and, if desired, with an adjacent portion of the continuous conduit forming the dry evaporator 14'. In the form shown in Fig. 3, the defrost water from the back wall 8 and from the inclined section 26 of the bottom wall drains downwardly and forwardly to the low central point 27, and defrost water from the section 28 of the bottom wall drains rearwardly and downwardly to the low central point 27.

This defrost water is collected in a trough 30 which is substantially wider than the trough 24 and extends from a point forwardly of the evaporator door 12 to a point to the rear of the low point 27 of the evaporator structure. Thus the trough 30, as in the form previously described, collects both defrost water from the evaporator structure and moisture collecting on the evaporator door 12.

While I have shown and described specific embodiment of my invention, I do not desire my invention to be limited to the particular construction shown and described and I intend, by the appended claims, to cover all modifications within the spirit and scope of my invention.

What I claim as new and desire to secure by Letters Patent of the United States is:

1. In a refrigerating system, a dry evaporator comprising a header and a continuous conduit connected at both ends to said header, at least the portion of said conduit including said ends being arranged in a plane sloping downwardly and forwardly, said header being disposed at the forward portion of said evaporator and at the lower end of said portion of said conduit, said evaporator header being disposed below the level of substantially all of said conduit whereby liquid refrigerant drains from said conduit into said header, means for supplying liquid refrigerant to said conduit adjacent the highest point thereof and means for withdrawing vaporized refrigerant from said header, and means for heating the lower portion of said evaporator to vaporize liquid refrigerant, the vaporized refrigerant condensing with said conduit to effect removal of frost therefrom.

2. In a refrigerating system, a dry evaporator comprising a header and a continuous conduit connected at both ends to said header, said header being disposed at the lowest point of said evaporator and being disposed approximately midway between the front and back of said evaporator, said conduit being arranged in planes inclined downwardly toward said central header from the front and the back of said evaporator whereby liquid refrigerant drains from said conduit into said header, means for supplying liquid refrigerant to said conduit adjacent the highest point thereof and means for withdrawing vaporized refrigerant from said header, and means for heating said evaporator in the region of said header to vaporize liquid refrigerant, the vaporized refrigerant condensing within said conduit to effect removal of frost therefrom.

3. In a refrigerating system, a dry evaporator comprising a header and a continuous conduit connected at both ends to said header, said header being disposed at the lowest point of said evaporator, at least a portion of said conduit being disposed in a plane extending upwardly from said header whereby liquid refrigerant drains from said conduit into said header, a second conduit for supplying liquid refrigerant to said first-mentioned conduit, said second conduit being connected to said first-mentioned conduit at substantially the highest point thereof, means for withdrawing vaporized refrigerant from said header, means for heating said evaporator in the region of said header to vaporize liquid refrigerant, the vaporized refrigerant condensing within said conduit to effect removal of frost therefrom, and a trap in said second conduit immediately preceding said first-mentioned conduit for blocking entry of said vaporized refrigerant into said second conduit.

4. An evaporator structure comprising a sheet providing an inclined bottom wall thereof, a dry evaporator including a continuous conduit secured to said bottom wall and a header disposed at the lower end of said inclined bottom wall, said conduit being connected at both ends to said header, means for supplying liquid refrigerant to said conduit adjacent the highest point thereof and means for withdrawing vaporized refrigerant from said header, and a heater disposed in engagement with said header for vaporizing liquid refrigerant, the vaporized refrigerant condensing within said conduit to effect removal of frost therefrom.

5. An evaporator structure comprising a sheet formed to provide a back wall and a bottom wall inclined downwardly and forwardly from said back wall, a dry evaporator including a continuous conduit secured to said back and bottom walls and a header disposed at the forward end of said bottom wall, said conduit being connected at both ends to said header, means for supplying liquid refrigerant to said conduit adjacent the highest point thereof and means for withdrawing vaporized refrigerant from said header, and a heater disposed in engagement with said header for vaporizing liquid refrigerant, the vaporized refrigerant condensing within said conduit to effect removal of frost therefrom.

6. An evaporator structure comprising a sheet formed to provide a back wall and a bottom wall, said bottom wall being inclined downwardly from said back wall to the central portion of said bottom wall and being inclined upwardly from said central portion to the front end of said bottom wall, a dry evaporator including a continuous conduit connected to said back and bottom walls and a header disposed at the central lowest point of said bottom wall, said conduit being connected at both ends to said header, means for supplying liquid refrigerant to said conduit adjacent the highest point thereof and means for withdrawing the vaporized refrigerant from said header, and a heater disposed in engagement with said header for vaporizing liquid refrigerant, the vaporized refrigerant condensing within said conduit to effect removal of frost therefrom.

7. An evaporator structure comprising a sheet formed to provide a back wall and a bottom wall inclined downwardly and forwardly from said back wall, a second sheet spaced above said bottom wall to provide a shelf, a dry evaporator including a continuous conduit secured to said back and bottom walls and a header disposed at the forward end of said bottom wall, said conduit being connected at both ends to said header, a second conduit for supplying liquid refrigerant to said first-mentioned conduit, said second conduit being secured to said shelf for refrigerating said shelf and being connected to said first-mentioned conduit at substantially the highest point thereof, means for withdrawing vaporized refrigerant from said header, means for heating said evaporator in the region of said header to vaporize liquid refrigerant, the vaporized refrigerant condensing within said conduit to effect removal of frost therefrom, and a trap in said second conduit immediately preceding said first-mentioned conduit for blocking entry of vaporized refrigerant into said conduit whereby heating of said shelf during defrosting is minimized.

8. In a refrigerator comprising an evaporator structure, said evaporator structure including a sheet providing an inclined bottom wall thereof, a dry evaporator including a continuous conduit secured to said bottom wall and a header disposed at the lower end of said inclined bottom wall, said conduit being connected at both ends to said header, means for supplying liquid refrigerant to said conduit adjacent the highest point thereof and means for withdrawing vaporized refrigerant from said header, a heater disposed in engagement with said header for vaporizing liquid refrigerant, the vaporized refrigerant condensing within said conduit to effect removal of frost therefrom, said inclined bottom wall facilitating drainage of defrost water therealong to the lowest point thereof, and a trough disposed below said lowest point of said bottom wall for collecting said defrost water.

9. In a refrigerator comprising an evaporator structure, said evaporator structure including a sheet providing an inclined bottom wall thereof, said bottom wall being inclined downwardly and forwardly to the forward end of said evaporator structure, a door at the forward end of said evaporator structure for closing the access opening thereof, a dry evaporator including a continuous conduit secured to said bottom wall and a header disposed at the lower forward end of said inclined bottom wall, said conduit being connected at both ends to said header, means for supplying liquid refrigerant to said conduit adjacent the highest point thereof and means for withdrawing vaporized refrigerant from said header, a heater disposed in engagement with said header for vaporizing liquid refrigerant, the vaporized refrigerant condensing within said conduit to effect removal of frost therefrom, said inclined bottom wall facilitating drainage of defrost water therealong to the lower forward end thereof, and a trough disposed below said forward end of said bottom wall and below said door for collecting defrost water from said evaporator structure and for collecting condensed moisture from said door.

10. In a refrigerator comprising an evaporator structure, said evaporator structure including a sheet formed to provide a bottom wall thereof, said bottom wall being inclined downwardly and forwardly from the rear end thereof and downwardly and rearwardly from the forward end thereof to a low central point, a door at the forward end of said evaporator structure, an evaporator including a continuous conduit secured to said bottom wall and a header disposed at the low central point of said bottom wall, said conduit being connected at both ends to said header, means for supplying liquid refrigerant to said conduit adjacent the highest point thereof and means for withdrawing vaporized refrigerant from said header, a heater disposed in engagement with said header for vaporizing liquid refrigerant condensing within said conduit to effect removal of frost therefrom, said inclined bottom wall facilitating drainage of defrost water to the low central point thereof, and a trough disposed below said evaporator structure and extending from a point forwardly of said door to a point rearwardly of said low central point of said bottom wall whereby defrost water from said evaporator structure and condensed moisture from said door are collected in said trough.

References Cited in the file of this patent
UNITED STATES PATENTS

| | | |
|---|---|---|
| 1,970,340 | Ruff | Aug. 14, 1934 |
| 2,001,323 | Dick | May 14, 1935 |
| 2,081,479 | Fink | May 25, 1937 |
| 2,348,784 | Buhler | May 16, 1944 |
| 2,654,226 | Duncan | Oct. 6, 1953 |